United States Patent
Kranister et al.

(10) Patent No.: US 6,801,018 B2
(45) Date of Patent: Oct. 5, 2004

(54) BUFFER CIRCUIT

(75) Inventors: Andreas Kranister, Wilhelmsburg (AT); Harald Weinmeier, Vienna (AT)

(73) Assignee: Siemens AG Osterreich, Vienna (AT)

(*) Notice: Subject to any disclaimer, the term of this patent is extended or adjusted under 35 U.S.C. 154(b) by 135 days.

(21) Appl. No.: 10/297,268

(22) PCT Filed: May 30, 2001

(86) PCT No.: PCT/AT01/00176
§ 371 (c)(1),
(2), (4) Date: Dec. 2, 2002

(87) PCT Pub. No.: WO01/93411
PCT Pub. Date: Dec. 6, 2001

(65) Prior Publication Data
US 2004/0012988 A1 Jan. 22, 2004

(30) Foreign Application Priority Data
May 31, 2000 (AT) .......................................... 966/2000

(51) Int. Cl.⁷ .......................................... H01M 10/46
(52) U.S. Cl. .................................................... 320/166
(58) Field of Search ................................ 320/127, 135, 320/166

(56) References Cited

U.S. PATENT DOCUMENTS 4,197,582 A * 4/1980 Johnston et al. ............... 702/58
5,714,863 A 2/1998 Hwang et al.
6,366,070 B1 * 4/2002 Cooke et al. ................ 323/284

FOREIGN PATENT DOCUMENTS

| DE | 38 05 256 A | 8/1989 |
| DE | 195 42 085 A | 7/1996 |
| EP | 0 798 840 B1 | 10/1997 |
| EP | 0 798 840 A3 | 10/1997 |
| EP | 0 798 840 A2 | 10/1997 |

OTHER PUBLICATIONS

International Search Report of PCT/AT01/00176, dated Oct. 11, 2001.
International Preliminary Examination Report of PCT/AT01/00176, dated Apr. 9, 2002.

* cited by examiner

Primary Examiner—Edward H. Tso
(74) Attorney, Agent, or Firm—Christie, Parker and Hale, LLP

(57) ABSTRACT

The invention relates to a buffer circuit for a load (LAS) to be supplied by the supply DC voltage ($U_v$), comprising a buffer capacitor (Cp), which may be charged to a voltage ($U_H$) by means of a charging circuit (HSS). Said voltage is higher than the supply voltage and may be brought in for supply of the load by means of a step-down controller (TSS). An input of a step-down controller (TSS) is connected to the buffer capacitor ($C_p$) and the output thereof to the load (LAS), whereby a trigger circuit (TRI) is provided to activate the step-down controller on drop-out of the voltage ($U_v$) at the load.

7 Claims, 2 Drawing Sheets

BUFFER CIRCUIT

CROSS-REFERENCE TO RELATED APPLICATION

Figure 1:
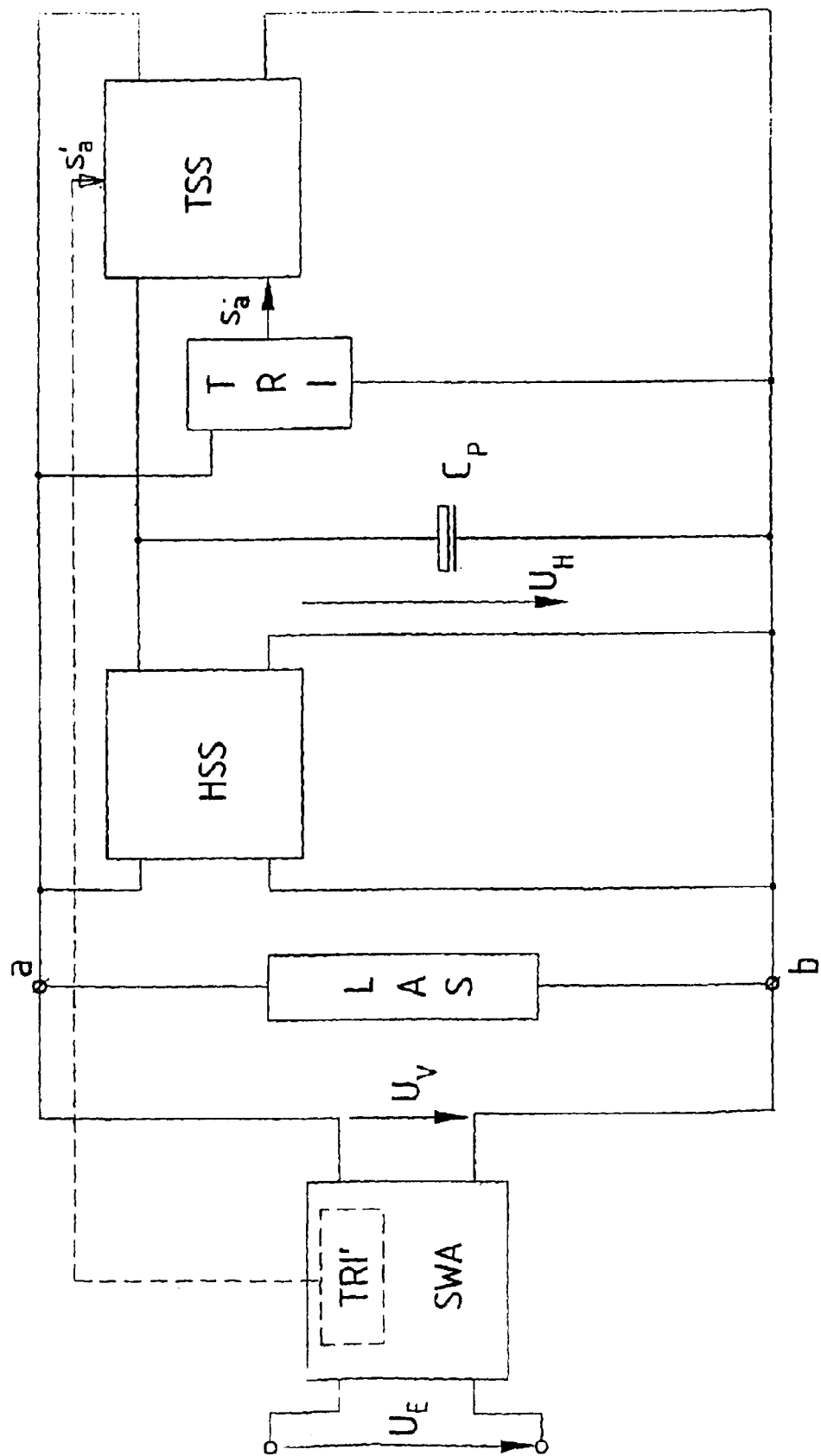

This application is a National Phase Patent Application of International Application Number PCT/AT01/00176, filed on May 30, 2001, which claims priority of Austrian Patent Application Number A 966/2000, filed May 31, 2000

The invention concerns a buffer circuit for a load to be supplied by a supply DC voltage, with a buffer capacitor, which can be charged to a voltage by a charging circuit, which voltage is higher than the supply DC voltage and which can be brought in at the time of dips in the supply voltage for supply of the load by a discharging circuit.

Buffer circuits are used to buffer a supply DC voltage, in order to be able to continue to operate devices temporarily in the event of voltage dips, e.g., in power grid voltage. This is, for example, important with electronic devices to avoid data losses without having to resort to the very expensive solution of uninterruptible power supplies that are fed by accumulators.

A problem which occurs with all buffer circuits of the art in question is the low energy that can be stored in a capacitor compared to accumulators, whereby this energy increases in direct proportion with capacitance but quadratically relative to the charging voltage. To save cost and volume, an increase of the buffer energy by increasing the capacitor voltage is naturally advisable.

It is known to provide buffer capacitors on the DC voltage input side of switching power supplies and to switch them in in the event of power grid failure. This solution is practical to use only with power supplies that are designed for a broad range of input voltages. The solution is, moreover, cost intensive and, for safety reasons, can hardly be located in an additional device separate from the actual power supply.

It is further known to charge a buffer capacitor on the load side of a power supply to the maximum tolerable voltage to obtain the highest possible buffer energy. If an AC voltage is available on the output portion of a power supply, one or a plurality of voltage doublers with diodes and capacitors may be used for the charging circuit. However, limits are usually set here since most consuming devices can operate properly only in a narrow voltage range.

Increasing the capacity of the buffer capacitor, whether in a DC voltage intermediate loop of a power supply unit or on the output side, i.e., the load side of a power supply unit, naturally always results in a corresponding increase of the stored energy; however, it also results in a substantially proportional increase in structural volume and costs.

The charging of buffer capacitors takes place in many cases via a resistor—which, however, is associated with high losses—or via a current source circuit. If a limitation of the voltage on the buffer capacitor is necessary or desired, this can be handled, for instance, by a Zener diode connected in parallel.

Known discharging circuits consist of a switch controlled by a trigger circuit and a limiting resistor, whereby the voltage must be limited possibly by a parallel regulator, a Zener diode, or by reopening the switch. In this process, in any case, half the stored buffer energy is lost as Joule heat.

DD 223,302 A1 presents a buffer circuit of the art in question, wherein an additional winding with a rectifier connected downstream is used on the transformer of a switching power supply to charge the buffer capacitor. The load is fed from a secondary winding with a rectifier connected downstream, and the actual supply voltage is coupled to the primary winding of the transformer via a controlled switch. In the event of power grid failure, there is feedback from the buffer capacitor to the primary side. After the fact installation of the buffer circuit disclosed here into an existing network device is not possible because of the design used.

JP 10 062456 A discloses a voltage monitoring circuit that delivers a reset signal to a CPU when the supply voltage of the CPU drops below a predefinable minimum.

DE 38 05 256 A1 discloses a circuit for the emergency power supply of a consuming device in a motor vehicle, whereby a storage capacitor is charged via a step-up controller. In normal operation, a selected consuming device is supplied via a regulator from the battery voltage; whereas, in the event of failure of the battery voltage, the capacitor is connected via an additional longitudinal regulator to the input of the aforementioned regulator and the selected consuming device is supplied.

A similar circuit is presented in DE 195 42 085 A1. Here again, a selected consuming device that represents only a fraction of the possible total load of the auto battery is temporarily supplied in the event of a failure. The supply again occurs from a capacitor which is charged by a step-up controller, whereby the voltage is fed to the selected consuming device via a stabilizer.

In both EP 0 798 840 A2 and in U.S. Pat. No. 5,714,863, circuits are described that are to avoid the problem of voltage dips of an accumulator of a mobile power supply during bursts of transmission. In each case, both a step-up controller that charges a capacitor and a step-down controller that supplies the mobile radio or at least its final stage are provided. The step-up controller and the step-down controller are always in operation and the presence of the battery voltage is likewise a requirement. In this case, emergency operation is neither possible nor considered.

One object of the invention is to provide a buffer circuit that achieves, on the one hand, high stored energy with relatively low cost and small structural volume, and can, on the other, be connected directly to the load to be buffered, i.e., merely with a two wire connection.

One object of the invention is to provide a buffer circuit that achieves high stored energy with relatively low cost and small structural volume. [sic]

This object is achieved with a buffer circuit of the type mentioned in the introduction that is characterized according to the invention by a step-down controller, whose input is coupled to the buffer capacitor and whose output is coupled to the load, and a trigger circuit, which is configured to activate the step-down controller in the event of dropout of the voltage at the load.

The buffer circuit according to the invention offers not only the advantages of low cost and minimal structural volume with maximum stored energy, but it also can be located in an external device that can be used as an add-on to an already existing power supply.

If the charging circuit is a step-up controller whose input is coupled to the load and whose output is coupled to the buffer capacitor, it is possible, on the one hand, to avoid the losses inherent to a charging resistor and, on the other, not to have to rely on the level of the supply voltage or an auxiliary voltage, generated, for instance, by voltage doubling.

In a solution expedient due to its cost advantage, the trigger circuit is configured to deliver switching pulses to the step-down controller.

To avoid circuit technology problems, it is advantageous, particularly with a relatively high supply DC voltage or a relatively high voltage on the buffer capacitor, to provide a potential segregation means for the trigger circuit. In this case, provision can advantageously be made for the potential segregation means to be a transformer via which the output of the trigger circuit is connected to the step-down controller.

Provision is made in a practical and simple embodiment of the invention for the step-up controller to have a first controlled switch, via which a first inductance can be periodically connected to the load voltage, plus a first capacitor coupled in parallel to the load, as well as a first diode leading to the buffer capacitor from the connection of the first inductance with the first switch.

For the same reasons, an embodiment maybe advisable in which the step-down controller has a second controlled switch via which the voltage on the buffer capacitor can be periodically connected to the load in series with a second inductance, to which load a second capacitor is coupled in parallel, and the series connection of the second inductance with the second capacitor is jumpered by a backflow diode.

The invention along with additional advantages is explained in detail in the following with reference to exemplary embodiments depicted into drawings. They depict:

FIG. 1 the invention using a schematic diagram, and

Figure 2:
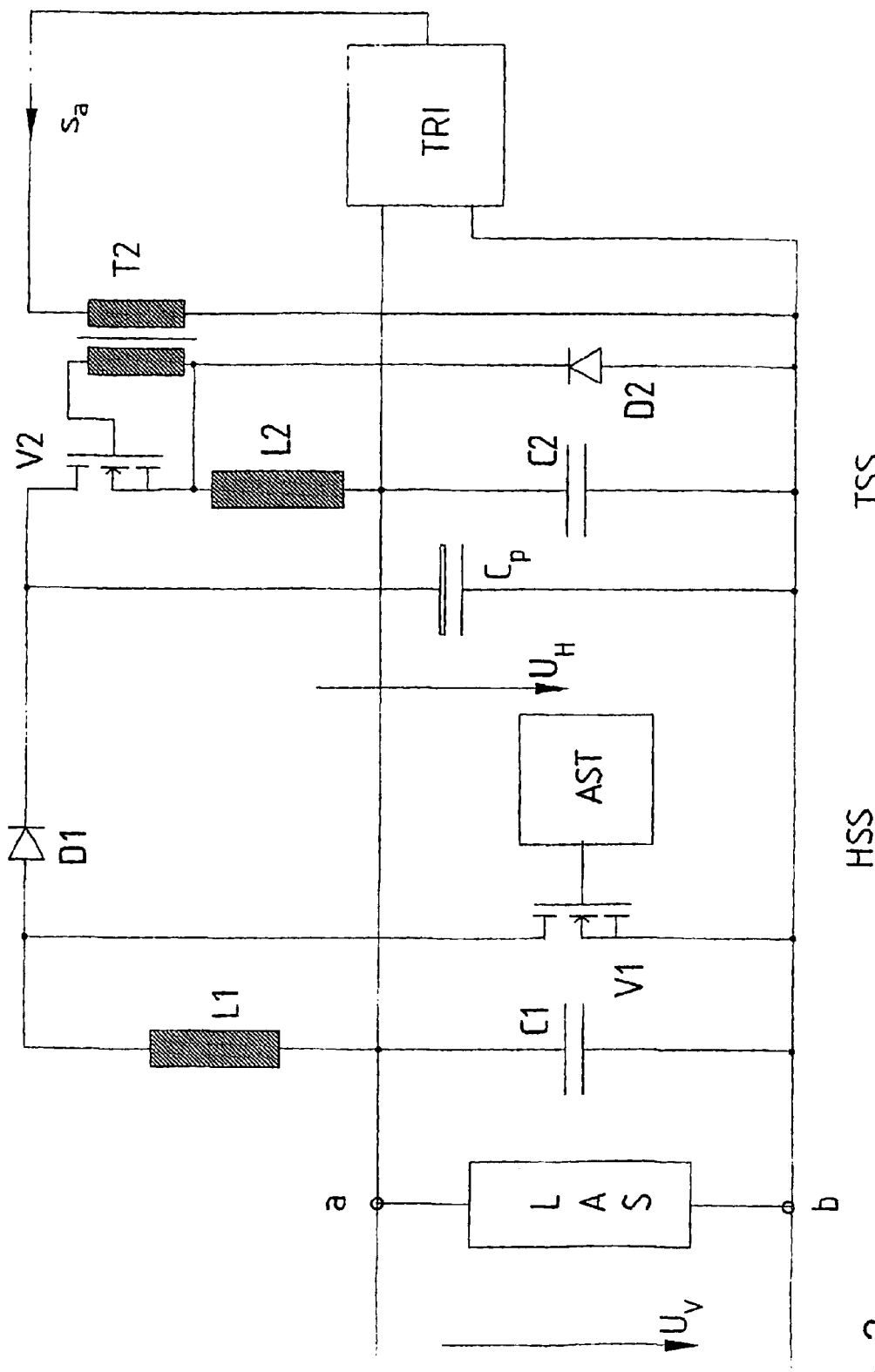

FIG. 2 a circuit according to the invention, detailed, yet restricted to the essentials.

As is discernible from FIG. 1, an input voltage $U_E$, e.g., power grid AC voltage of 230 volts is converted in a switching converter SWA into a supply DC voltage $U_V$, e.g., 24 volts, that is connected to the terminals of a load LAS. The load LAS may, in principle, be any consuming device; however, in the context of the invention a failure-critical device is primarily considered.

A step-up controller HSS is connected by its input to the load terminals, whereas a buffer capacitor $C_p$ is coupled to the output of the step-up controller. Thus, the load voltage, which corresponds, with a properly operating switching converter SWA, to its output voltage, i.e., the supply DC voltage $U_V$, is coupled to the input of the step-up controller HSS.

Step-up controllers are known to the person skilled in the art in many implementations. These are switching converters that convert a first DC voltage, in this case $U_V$, into a second DC voltage that is greater than the first voltage. The second DC voltage is, in the present case, the voltage $U_H$ on the buffer capacitor $C_p$. For instance, if the supply voltage is 24 volts and if this is stepped up to the voltage $U_H$=100 volts, the energy E of the capacitor $C_p$ charged to 100 volts is $E_{100}=10^4 \cdot C_p/2$. Without a step-up controller, the capacitor $C_p$ can be charged to only 24 volts, which would correspond to energy of $E_{24}=288\ C_p$. The energy values thus differ by a factor of approximately 35.

In a simplified embodiment, the buffer capacitor may also be charged via a charging resistor by a voltage that is higher than the supply voltage. This can be the case, in particular, if such a higher voltage, which actually serves a different purpose, is present at a switching converter output, or if the higher DC voltage can be obtained from an AC voltage via a simple voltage doubling circuit, e.g., with two diodes and capacitors.

The voltage $U_H$ of the buffer capacitor $C_p$ is coupled to the input of a step-down controller TSS, whose output is coupled to the load terminals a, b, and whose role it is, when necessary, to convert the voltage $U_H$ on the buffer capacitor $C_p$ to the voltage $U_V$, i.e., the necessary load voltage. Step-down controllers are also known to the person skilled in the art in many variants. They should drop a first DC voltage, in this case $U_H$, to a second, lower DC voltage, in this case to $U_V$.

A trigger circuit TRI monitors the load voltage $U_V$, e.g., by comparison with a reference voltage and is configured to feed the step-down controller TSS an activation signal sa as soon as the load voltage $U_V$ drops to a specific value, e.g., 0.7 $U_V$. The trigger circuit TRI can, for instance, generate the switching pulse necessary for the operation of the step-down controller TSS and deliver it to the step-down controller TSS. In this case, the activation signal sa is a pulse sequence with a specific pulse duty factor. On the other hand, the switching pulses may also be generated in the step-down controller TSS itself and released via the activation signal $s_a$.

When the voltage on the load LAS dips, for example because of a failure of the input voltage $U_E$, the trigger circuit TRI activates the step-down controller TSS, which now supplies the load LAS with the correct supply voltage from the energy of the buffer capacitor $C_p$ until either the actual supply voltage $U_V$ has again reached a certain minimum value or until the voltage of the buffer capacitor $C_p$ has dropped to a value at which the step-down controller TSS no longer operates. Of course, the trigger circuit TRI must cancel the activation signal sa as soon as the supply voltage $U_V$ has reached its normal value.

With regard to the trigger circuit TRI, it may, as described here, monitor the voltage on the load LAS directly, but the voltage may also be monitored on the input side of a switching converter. In any case, the trigger circuit can at least sometimes also be housed in a switching converter, as depicted in FIG. 1 by a broken line, a trigger block TRI', and a signal $s'_a$. In this case, the block "TRI" in FIG. 1 could even be omitted.

FIG. 2 depicts in greater detail a practical embodiment of the invention; however, details unnecessary for the explanation of the invention or already commonly known to the person skilled in the art are omitted.

The load LAS is supplied by a DC voltage $U_V$, which may, for example, be delivered by a switching converter. A buffer circuit according to the invention is connected to the terminals a, b of the load LAS, whereby it should be clear that the buffer circuit can be incorporated even after the fact into an existing power supply or can be connected to the load via a cable as an add-on device.

The step-up controller HSS consists of a capacitor C1, an inductance L1, a first controlled switch V1, along with a control circuit AST and a first diode D1, whereby the capacitor C1 is coupled in parallel to the load LAS and the series connection of the inductance L1 and of the switch V1 is coupled parallel thereto. From the connection point of the inductance with the switch V1, the diode D1 leads to the buffer capacitor $C_p$. The control circuit AST delivers, in known fashion, a pulse sequence with a pulse duty factor that is constant in the simplest case or is variable, for instance, for the regulation of the voltage $U_H$ on the buffer capacitor $C_p$ depending on this voltage.

The step-down controller TSS is, when necessary, supplied by this voltage $U_H$, which can be significantly higher than the voltage $U_V$ on the load LAS. The step-down controller has, coupled in series to the buffer capacitor $C_p$, a second controlled switch V2, a second inductance L2, and a second capacitor C2, whereby a backflow diode D2 is coupled in parallel to the series connection inductance L2—capacitor C2. The second controlled switch V2 is also supplied by pulses with constant or optionally variable pulse width. In the present case, the pulses are generated in the trigger circuit TRI, to which the load voltage $U_V$ is coupled, such that this can be monitored. As soon as the load voltage $U_V$ drops below a predefinable critical value, the trigger circuit TRI connects, for activation of the step-down controller, the pulse sequence as activation signal $s_a$ to the control input of the second switch V2, whereby a transformer T2 serves in this case for potential segregation. Other means, e.g., an optical coupler, even in a different location, e.g., on the input side, could also be used for potential segregation.

The step-down controller TSS now reduces the high voltage $U_H$ on the buffer capacitor $C_p$ to the value required by the load LAS and supplies the load LAS until either the load voltage has returned to the supply voltage or the energy of the buffer capacitor has been exhausted. The buffer capacitor is dimensioned such that the load can be supplied for a period of time that is adequate, for example, to shut down a system, so that no data loss occurs.

When the term "a" or "the" buffer capacitor is used in connection with the invention, this naturally includes the parallel and/or serial connection of multiple capacitors reflecting actual practice.

What is claimed is:

1. Buffer circuit for a load (LAS) to be supplied directly by a supplied DC voltage ($U_v$), with a buffer capacitor ($C_p$), which may be charged to a voltage ($U_H$) by means of a charging circuit (HSS), which voltage is higher than the supply voltage, and which can be brought in to supply the load in the event of dips in the supply voltage via a discharging circuit (TSS), characterized by a step-down controller (TSS), whose input is coupled to the buffer capacitor ($C_p$) and whose output is coupled to the load (LAS) and to the supply DC voltage ($U_v$), and a trigger circuit (TRI), which is configured to activate the step-down controller in the event of dropout of the supply voltage at the load.

2. Buffer circuit according to claim 1, characterized in that the charging circuit is a step-up controller (HSS), whose input is coupled to the load (LAS) and use output is coupled to the buffer capacitor ($C_p$).

3. Buffer circuit according to claim 1 or 2, characterized in that the trigger circuit (TRI) is configured to deliver switching pulses to the step-down controller (TSS).

4. Buffer circuit according to claim 1, characterized in that a potential segregation means (T2) is provided for the trigger circuit (TRI).

5. Buffer circuit according to claim 4, characterized in that the potential segregation means is a transformer (T2), via which the output of the trigger circuit (TRI) is connected to the step-down controller (TSS).

6. Buffer circuit according to claim 2, characterized in that the step-up controller (HSS) has a first controlled switch (V1), via which a first inductance (L1) can be periodically connected to the load voltage ($U_v$), plus a first capacitor (C1) coupled in parallel to the load, as well as a first diode (D1) leading to the buffer capacitor ($C_p$) from the connection of the first inductance with the first switch.

7. Buffer circuit according to claim 1, characterized in that the step-down controller (TSS) has a second controlled switch (V2), via which the voltage ($U_H$) on the buffer capacitor ($C_p$) can be periodically connected to the load (LAS) in series with a second inductance (L2), to which load a second capacitor (C2) is coupled in parallel, and the series connection of the second inductance with the second capacitor is jumpered by a backflow diode (D2).

* * * * *